L. J. CAMPBELL.
VARIABLE SPEED TRANSMISSION MECHANISM.
APPLICATION FILED SEPT. 10, 1919.
1,388,548.
Patented Aug. 23, 1921.
6 SHEETS—SHEET 1.
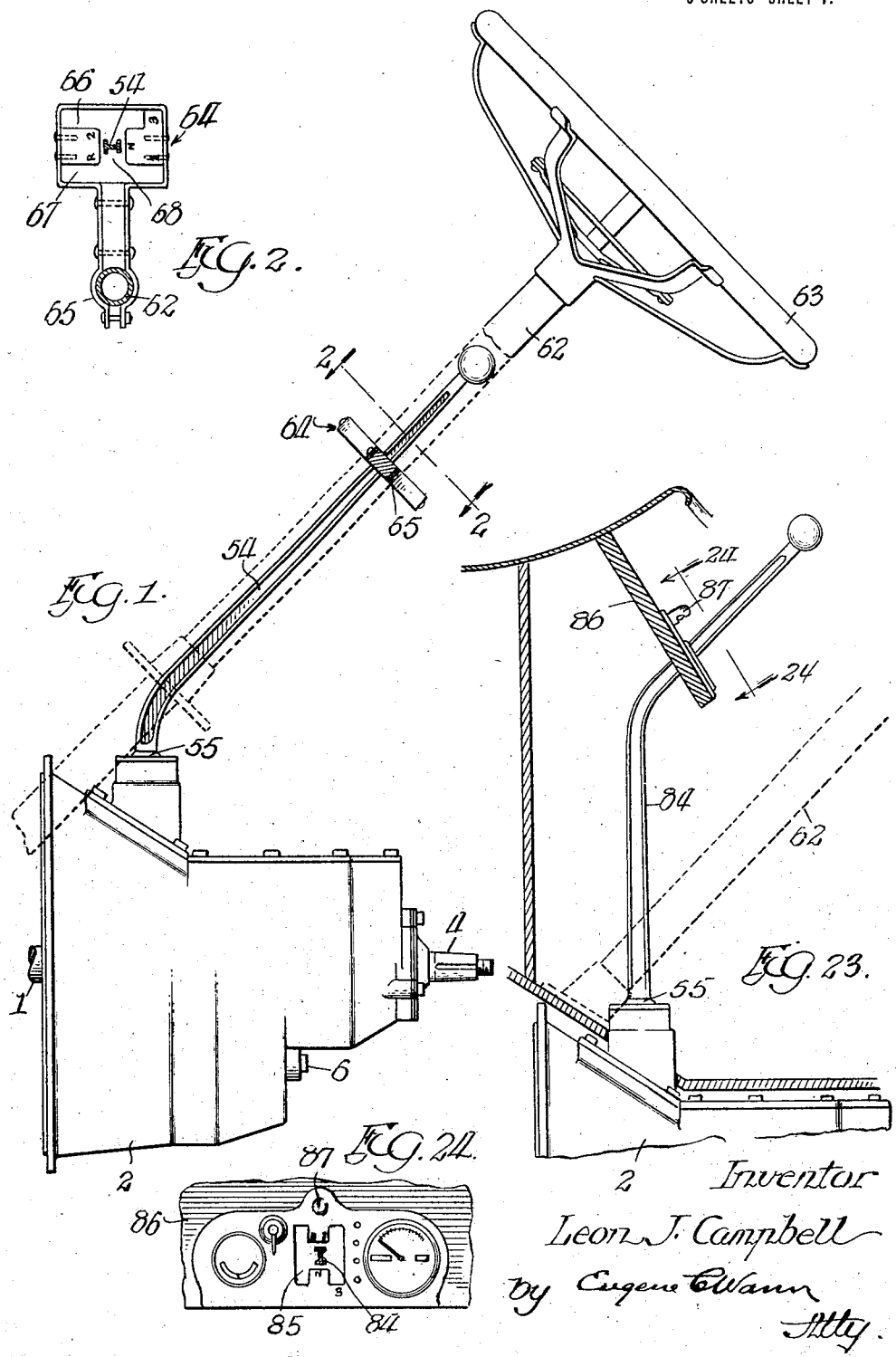

L. J. CAMPBELL.
VARIABLE SPEED TRANSMISSION MECHANISM.
APPLICATION FILED SEPT. 10, 1919.
1,388,548.
Patented Aug. 23, 1921.
6 SHEETS—SHEET 2.
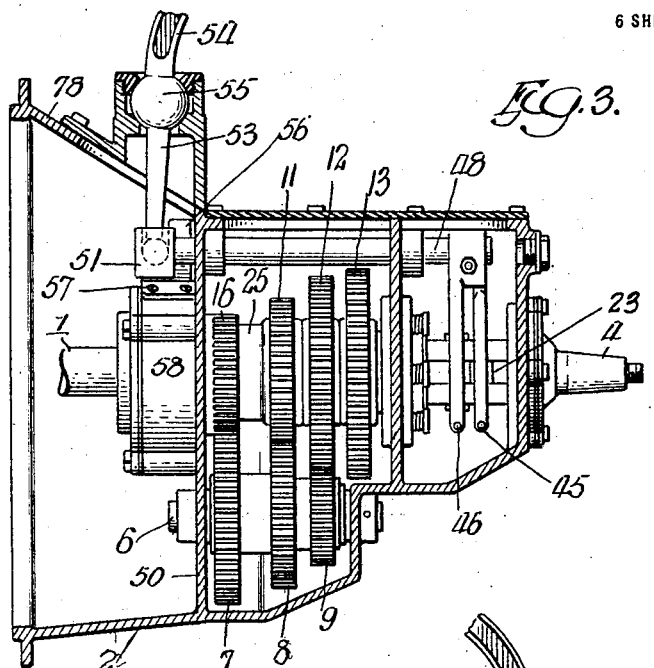
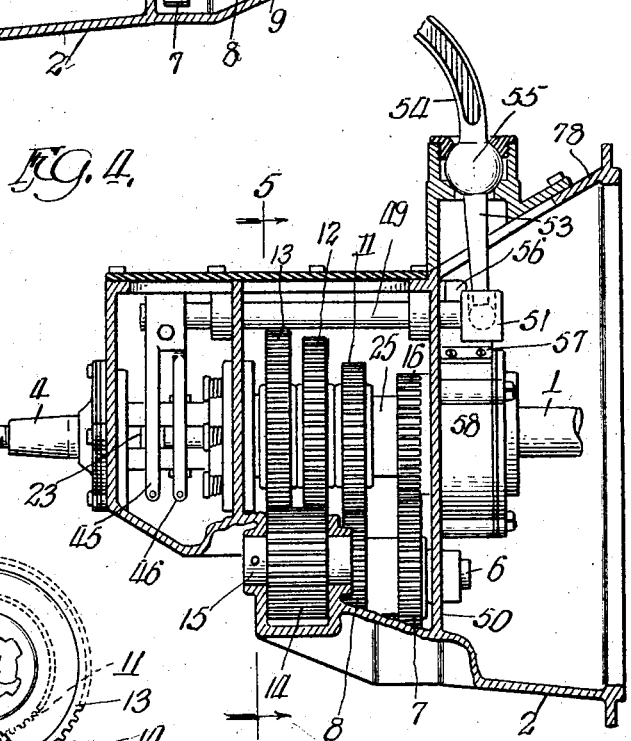
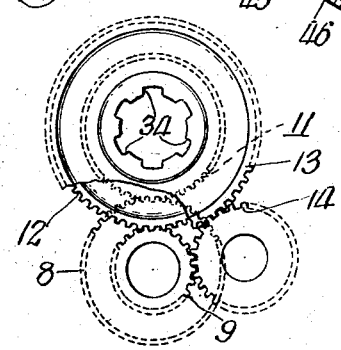
Inventor
Leon J. Campbell
by Eugene Cubine Atty

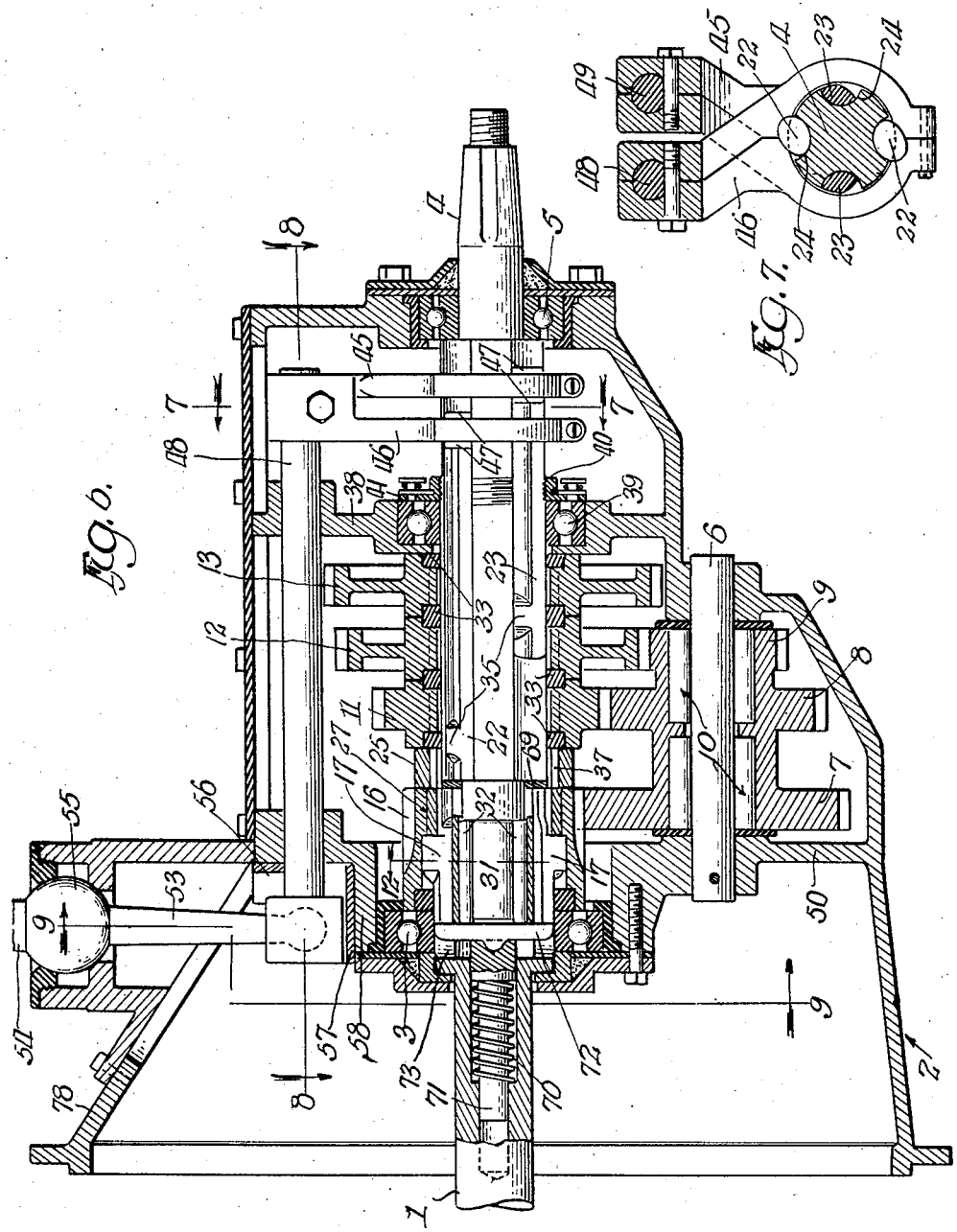

L. J. CAMPBELL.
VARIABLE SPEED TRANSMISSION MECHANISM.
APPLICATION FILED SEPT. 10, 1919.
1,388,548.
Patented Aug. 23, 1921.
6 SHEETS—SHEET 4.
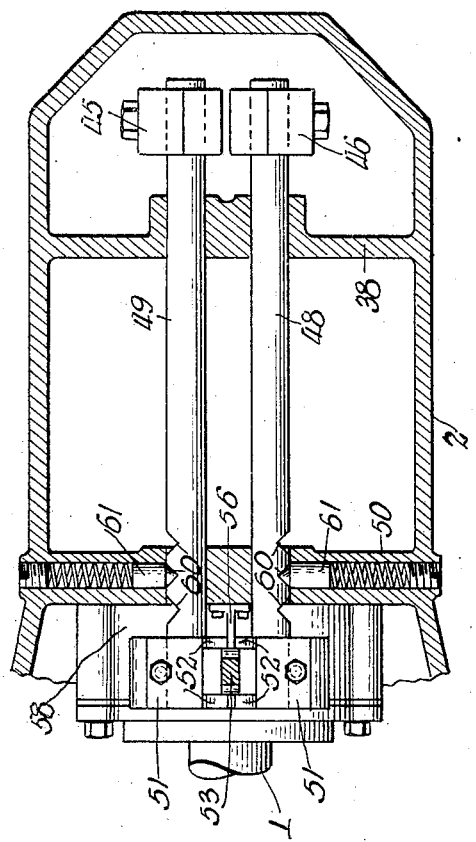
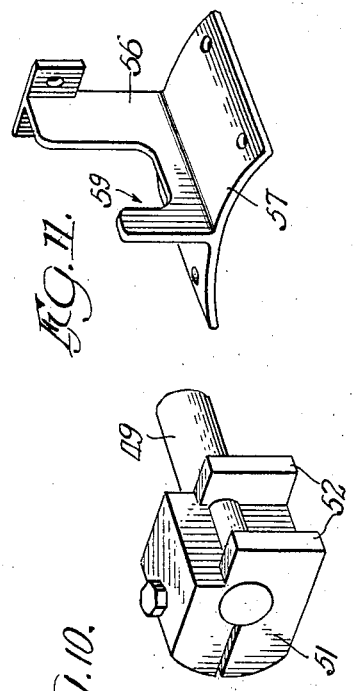
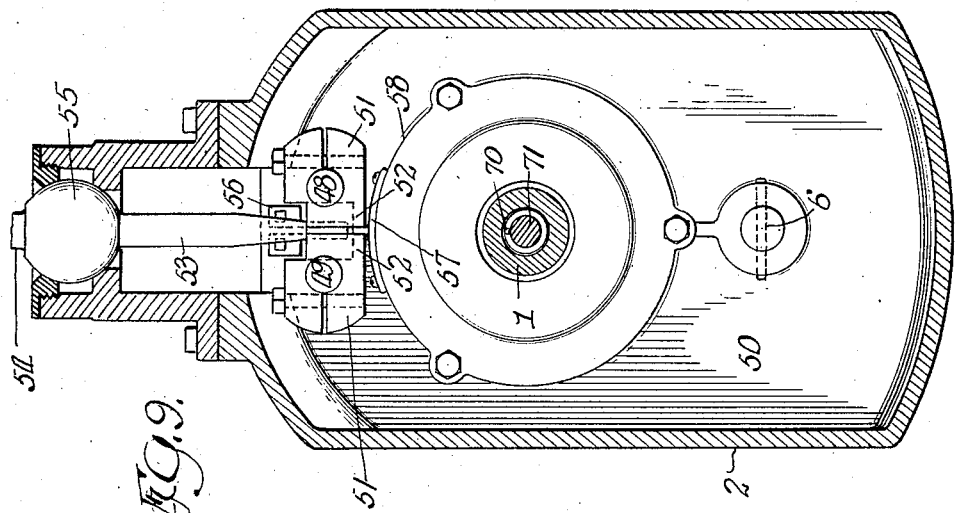
Inventor
Leon J. Campbell
by Eugene Cowan Atty

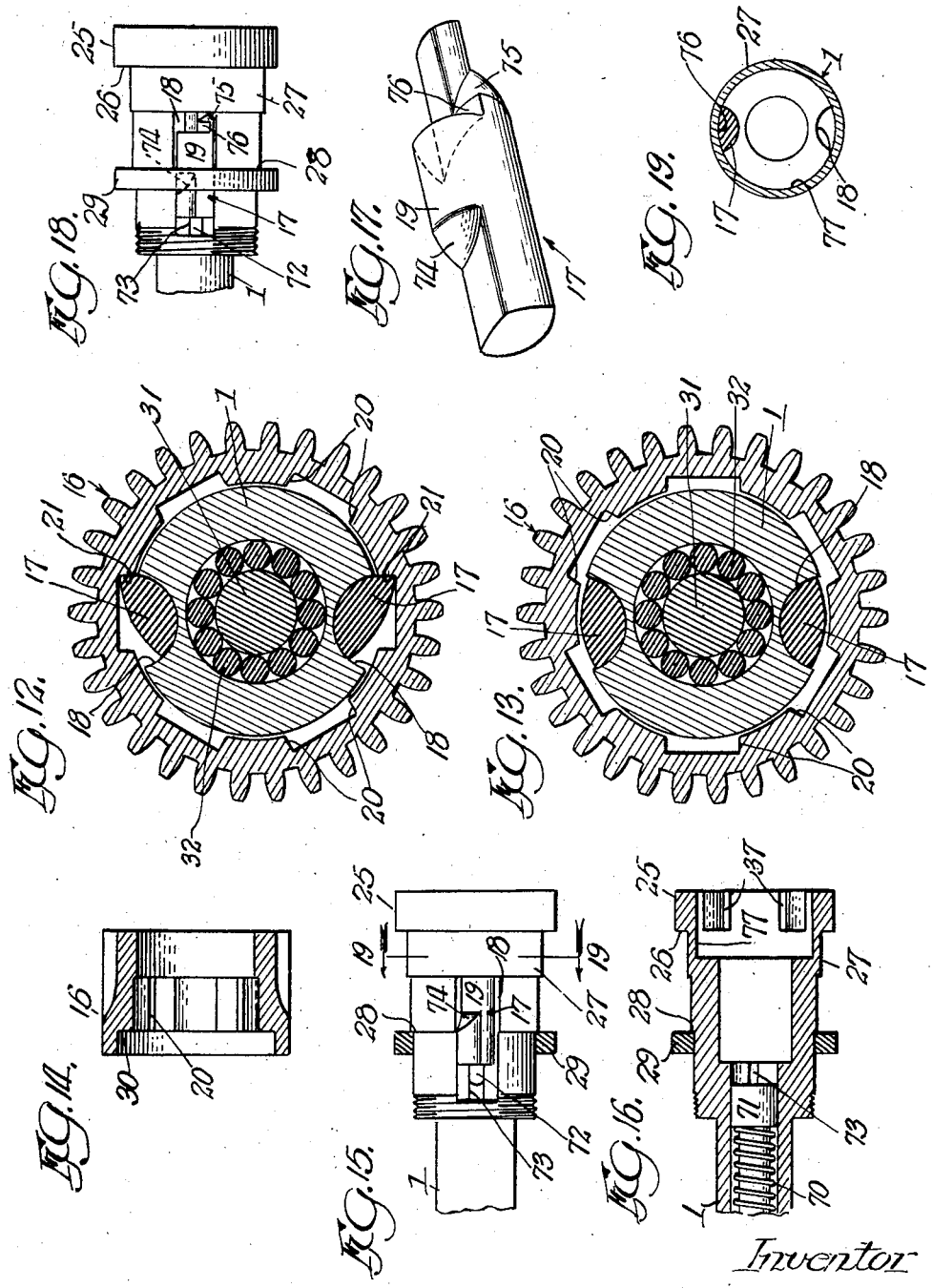

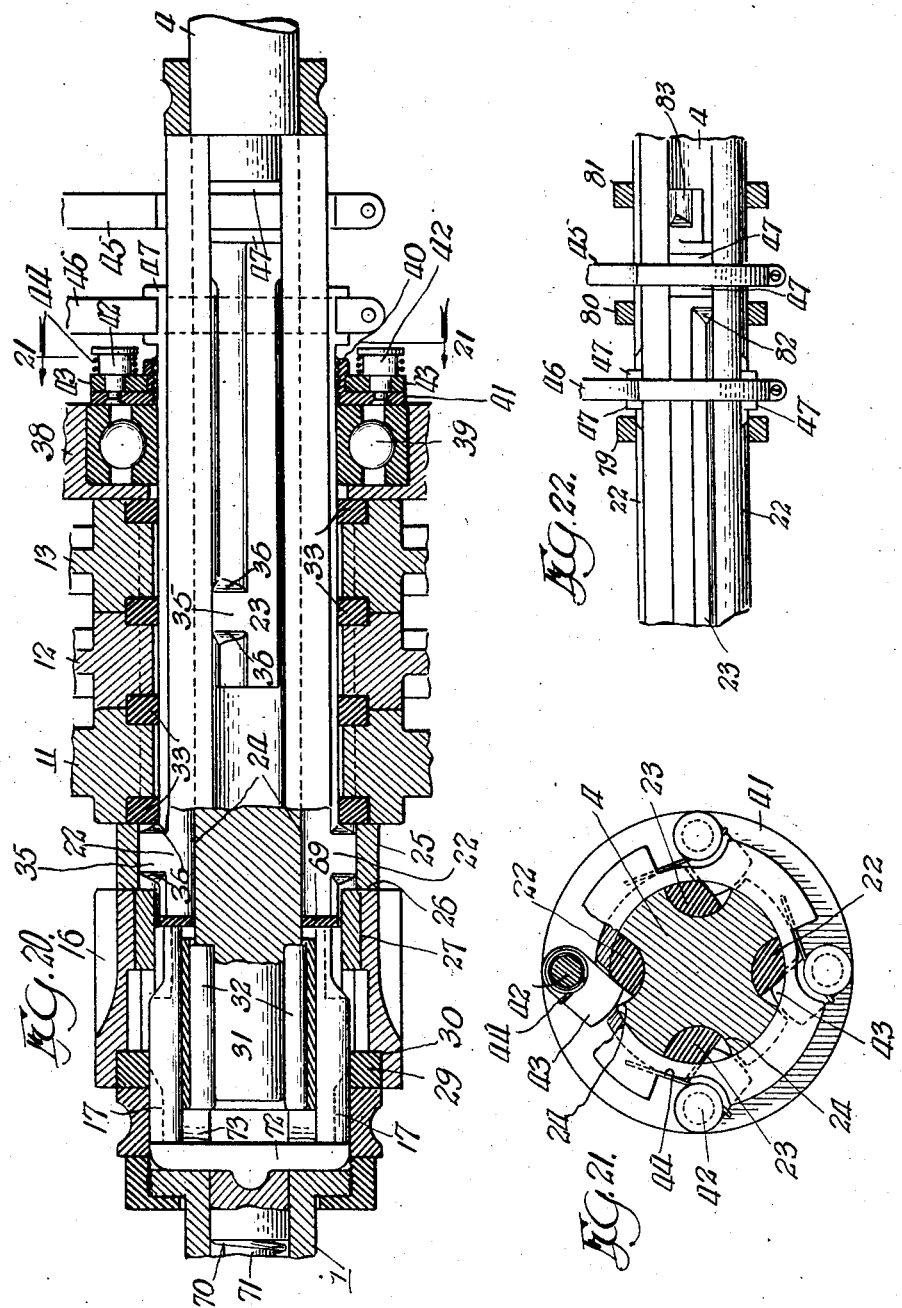

UNITED STATES PATENT OFFICE.

LEON J. CAMPBELL, OF BUCHANAN, MICHIGAN.

VARIABLE-SPEED-TRANSMISSION MECHANISM.

1,388,548.   Specification of Letters Patent.   Patented Aug. 23, 1921.

Application filed September 10, 1919. Serial No. 322,837.

*To all whom it may concern:*

Be it known that I, LEON J. CAMPBELL, a citizen of the United States, residing at Buchanan, in the county of Berrien and State of Michigan, have invented new and useful Improvements in Variable - Speed-Transmission Mechanisms, of which the following is a specification.

This invention relates to variable speed transmission mechanisms, and consists of the matters hereinafter described and more particularly pointed out in the appended claims.

The invention is herein illustrated and described as embodied in a variable speed transmission for motor vehicles, such as automobiles, trucks, and the like, and has for among its objects to provide an all-in-mesh gear device permitting selection to be made of the various speeds without shifting the gears, and to render the gears idle when a direct connection is made between the driving and driven shafts, and thus produce a silent transmission by avoiding humming of the gears. A further object of the invention is to permit the shift or control lever to be located alongside of the steering post or to project through the dash or instrument board and thus be readily accessible to the driver from his seat to effect a change of speed without materially changing his position of steering. Another object of the invention is to provide a plurality of sets of slidably and rockably mounted keys, the keys of one set being longer than the keys of another set, and used to lock and unlock the various speed gears to and from the shaft upon which they are loosely mounted, thereby reducing the overall length of the parts and producing a compact construction. Other and further objects of the invention will appear from the following specification, taken in connection with the accompanying drawings, in which—

Figure 1 is a side view of the transmission mechanism of my invention, and looking at the same from the exterior of the hollow casing which houses and incloses the main operative parts of the device and shows the control or shift lever extending upward alongside the steering post of the motor vehicle to which said device is applied;

Fig. 2 is a top plan view of the sector plate secured to said post and through which said control lever extends, the view being partly in section and taken on line 2—2 of Fig. 1;

Fig. 3 is a longitudinal vertical sectional view, with parts in elevation, taken through the transmission case and looking into the same from the side opposite the reverse gear wheel;

Fig. 4 is a like sectional view, only that the transmission case is looked into from the opposite side thereof;

Fig. 5 is a vertical sectional view taken on line 5—5 of Fig. 4, with all parts except the gear wheels omitted for the purpose of illustration;

Fig. 6 is an enlarged longitudinal sectional view through the transmission mechanism and showing the parts in neutral position;

Fig. 7 is a vertical sectional view taken on line 7—7 of Fig. 6;

Fig. 8 is a longitudinal sectional view taken on line 8—8 of Fig. 6;

Fig. 9 is a vertical sectional view taken on the indirect line 9—9 of Fig. 6;

Fig. 10 is a perspective view of one of the blocks at one end of each of the shifter rods;

Fig. 11 is a perspective view of the separator plate interposed between the shifter blocks;

Fig. 12 is an enlarged transverse vertical sectional view taken on line 12—12 of Fig. 6 and showing the keys in locking position;

Fig. 13 is a like view showing said keys in unlocking position;

Fig. 14 is a longitudinal sectional view of one of the gear wheels;

Fig. 15 is a top plan view of the inner end of one of the shafts and showing one of the keys therein which coact with the gear wheel of Fig. 14, the latter being omitted for the sake of illustration;

Fig. 16 is a longitudinal sectional view take through the shaft shown in Fig. 15, the section being taken between the keys;

Fig. 17 is a perspective view of one of the keys on the said shaft;

Fig. 18 is a view of the same parts shown in Fig. 15, except that the key is shown in unlocking position;

Fig. 19 is a vertical sectional view taken on line 19—19 of Fig. 15, with one of the keys omitted for the purpose of illustration;

Fig. 20 is a longitudinal sectional view through the parts shown in Fig. 6, and illustrating the manner in which one set of keys directly connects the driving and driven shafts together;

Fig. 21 is a transverse sectional view taken on line 21—21 of Fig. 20;

Fig. 22 is a modified form of a detail of construction to be hereinafter described;

Fig. 23 is a view showing the control or shift lever extending upward from the casing of the transmission mechanism and arranged to extend outward through a guide slot in the dash or instrument board, and Fig. 24 is a sectional view with parts in elevation, taken on line 24—24 of Fig. 23.

A variable speed transmission mechanism of my invention is particularly designed for motor vehicles of the pleasure as well as the commercial type, although it may be employed without change in its essential features on a machine requiring a change of speed from time to time between its driving and driven parts. When the mechanism is applied to a motor vehicle, it comprises a driving shaft 1, to which is connected one of the members of the clutch interposed between said shaft and the crank shaft of the motor. Said shaft 1 is journaled at its inner end in a hollow casing 2 on bearing balls 3, as shown in Fig. 6, and terminates short of another shaft 4 located in said casing 2 and in axial alinement therewith, the shaft 4 being the driven shaft and journaled on bearing balls 5. Said shaft 4 is connected with the rear axle of the vehicle through a propeller shaft, as is customary in automobile construction. Mounted in said housing 2 below the shaft 4 is a lay shaft 6, upon which rotate gear wheels 7, 8 and 9 decreasing in diameter in the order named. Said gear wheels are spooled together or are made in one piece to rotate in unison about said shaft 6, there being roller bearings 10 interposed between the gear cluster and said shaft. Loosely mounted on said shaft 4 is a plurality of gear wheels 11, 12 and 13, increasing in diameter in the order named and with the first two constantly in mesh with the gear wheels 8 and 9, respectively. The gear wheel 13 meshes constantly with a reverse idler 14 loosely mounted on a shaft 15 fixed in said casing 2, as shown in Fig. 4. The reverse idler 14 is also in constant mesh with the gear wheel 9, as shown in Fig. 5.

Loosely mounted on the inner end of the shaft 1 is a gear wheel 16 constantly in mesh with the gear wheel 7. Said gear wheel 16 is connected to and disconnected from said shaft 1 by a plurality of keys 17, 17, there being two in number, as shown in Fig. 6. Said keys 17 are diametrically arranged, and each is slidably and rockably mounted in a semi-cylindric groove or key-way 18 formed in the shaft 1. Each key 17 is provided with a locking lug 19, which when in one position projects beyond the shaft 1 and engages one of the internal locking shoulders 20 of the gear wheel 16, as shown in Fig. 12, and connects said gear wheel with the shaft 1. Each lug 19 is provided on one side with a flat face 21 for contact with a like face on the shoulder 20, for the purpose set forth in my prior Patents No. 1,135,354, granted April 13th, 1915, and No. 1,245,315, granted November 6th, 1917. When the lugs 19 are in unlocking positions as shown in Fig. 13, the gear wheel 16 is disconnected from the shaft 1.

For connecting and disconnecting the several gear wheels 11, 12 and 13 to and from the shaft 4, two sets of keys are provided, with the keys of each set arranged in pairs, and one set comprising the keys 22, 22, and the other set the keys 23, 23, as shown in Figs. 6, 7, 20 and 21. The keys of each set are diametrically arranged and each key is slidably and rockably mounted in a concave groove or key-seat 24 in the shaft 4. As shown, the inner end of the shaft 1 is enlarged as at 25 to provide an annular shoulder 26, against which bears the gear wheel 16. Said shaft 1 is provided in advance of said shoulder with a cylindric bearing surface 27 for said gear wheel, and with an annular shoulder 28 against which bears a ring 29 received in a recess 30 in said gear wheel 16. As shown in Figs. 6 and 20, the inner end of the shaft 1 is hollow and receives the reduced forward end portion 31 of the shaft 4, there being roller bearings 32 interposed between such parts. The key-ways 24 open through the end of the shaft 4 at its reduced end to permit the keys 22, 22, to be projected beyond such end of the shaft. Said shaft 4 is surrounded by collars 33 between the gear wheels 11, 12 and 13, and each gear wheel is provided with internal shoulders 34, as shown in Fig. 5, like the shoulders 20 heretofore described. Each key 22, 23 is provided with a locking lug 35 for engagement with said shoulders 34 on the gear wheels with which said keys co-act. Each lug 35 has a flat contact face like the key 17, and is also provided at each side of said lug with an inclined surface 36 (Fig. 20) to effect the rocking of the key out of locking position by contact with the collars 33. When the keys 22, 23 have been moved endwise into positions with their lugs 35 beneath the collars 33, all of the keys are held by the collars in unlocked position, and none of the gear wheels 11, 12 and 13 are connected with the shaft 4. Figs. 3, 4 and 6 show the parts in such positions.

The part 25 of the shaft 1 surrounds the end of the shaft 4 through which the key-ways 24 extend, and such part 25 is provided with internal shoulders 37, like the ones 34, and to be engaged by the locking lugs 35 of the keys 22. For rocking the keys 22, 23 into locking position, that is with their lugs 35 projecting beyond the shaft 4 when the lugs have been moved out of engagement with the collars 33, I provide the following construction. The casing 2 is provided with a transverse web 38 having a bearing 39 for the shaft 4. Screwed on the latter from one side of said bearing is a collar 40 having a flange 41, to which is secured a plurality of studs 42 extending laterally therefrom to form pivotal supports for members 43 having their inner or swinging ends bearing against the associated keys 22, 23. Said keys 22, 23 have the cross-sectional shape shown in Fig. 21, to provide a flat face against which the associated member 43 bears. Each member 43 is held against its key by a spring 44 coiled about the stud 42 and having one end engaged with the member 43 and the other bearing against the collar 40. When the keys are shifted endwise and their lugs 35 moved from beneath the associated collars 33, the members 43 act to rock the keys and cause their lugs 35 to engage the internal shoulders of the gear wheel with which the lugs co-act. For moving or shifting the keys endwise, I provide two yokes 45, 46, the latter connected with the pair of keys 22 and the former with the pair of keys 23, so that one set of keys may be moved independently of the other for selecting different speeds. Each yoke is connected with its set of keys by ears 47, 47, at the ends of the keys. Above the shaft 4 are two endwise movable shift rods 48, 49, the former connected with the yoke 46 and the latter with the yoke 45, said rods being mounted in the web 38 and a web 50, as shown in Fig. 8. Both rods have substantially the same length and each is provided at its forward end with a block 51, having spaced lugs 52, 52, projecting from one side thereof. The lugs 52 on one block project toward the lugs on the opposite block and provide a space therebetween to receive the lower end 53 of a control or shift lever 54 when moved sidewise about its ball 55. Extending upward between the blocks 51 is a plate 56 having a base web 57 secured to a flange 58 of the casing 2. Said plate 56 is provided with a slot 59 opening upwardly and registering laterally with the space between the lugs 52 on opposite sides thereof, when the parts are in neutral position as shown in Figs. 6, 8 and 9. At such time no portion of the plate 56 extends across such space, and thus does not interfere with the lateral movement of the lower end of the control lever 54 into and out of engagement with the blocks 51, 51. When the lever 54 has its lower end engaged with either block 51, any movement of the lever forward or rearward will impart a corresponding movement to the shifter rod thus connected with the lever. When either rod 48, 49 is moved forward or backward, the other is in its neutral position, as shown in Fig. 8, and the plate 56 extends over the space between the lugs 52, 52 with which the lever is engaged and prevents said lever from being moved, accidentally or otherwise, out of engagement with the rod with which it is thus connected. To hold the rods 48, 49 against accidental movement from any one of the positions into which they are moved by the control lever 54, I provide in each rod a plurality of V-shaped notches 60 engaged by a spring-pressed plunger 61 in the web 50. As shown in Fig. 1, the control lever 54 extends upward and alongside of the steering post 62 with its upper end in the form of a handle or knob and terminating short of and below the steering wheel 63 but within convenient reach of the operator from his seat. For said lever 54, I provide a sector plate 64, having a clamp 65 for connection with the steering post 62, the sector 64 having the standard H-shaped slot with two parallel portions 66, 67, and a cross portion 68. Said lever 54 extends upward through said slot, as shown in Figs. 1 and 2.

When the parts are in neutral position, they are as shown in Fig. 6, and the short keys 17, 17 lock the gear wheel 16 to the shaft 1, so that when the latter is rotated said gear wheel 16 revolves the rest of the gear wheels. The two sets of keys 22, 23 are held in unlocked position by the collars 33 with which they are engaged, and as none of the gear wheels 11, 12 and 13 are connected with the shaft 4 no power is transmitted thereto from the shaft 1. When the parts are thus positioned, the lever 54 extends upward through the H-shaped slot and stands in the cross part 68 thereof, as shown in Fig. 2. To indicate to the driver of the car that such is neutral position, the sector plate is marked "N" at such place. It will be noted that the keys 22, 22 are longer than the keys 23, 23, and that, when the parts are in neutral, the keys 22 have their locking lugs 35 beneath the collar 33 between the gear wheel 11 and the end 25 of the shaft 1, while the keys 23 have their locking lugs 35 beneath the collar 33 between the gear wheels 12 and 13, and the rods 48, 49 have their blocks 51, 51 directly opposite each other to permit the lower end of said lever 54 to be swung laterally into engagement with either one of said rods for selecting the speed desired. I will now describe how the parts operate when moved into first, second and third speeds in the order named, and then into reverse, and after that will describe how any one of said speeds and reverse may be selected without being required to pass the control lever 54 each time through neutral.

To move into first or slow speed from neutral, the lever 54 is grasped and moved out of the cross slot 68 into the slot 67. At the completion of that movement, the lower end of said lever is connected with the shift rod 49 by being between its lugs 52. The lever 54 is then moved downward to the bottom of the slot 67, and the rod 49 moved forward carrying the yoke 45 therewith and moving the keys 23, 23 forward to bring their lugs 35, 35 from beneath the collar 33 to beneath the gear wheel 12. The members 43 bearing against said keys rock the same into locking position and lock the gear wheel 12 to the shaft 4, thus permitting power to be transmitted to said shaft from the shaft 1 through the gear wheels 16, 7, 9 and 12. The other keys 22 and rod 48 occupy the positions shown in Fig. 6. To indicate on the sector plate in which direction to move the lever 54 to gain such speed, the sector plate is marked at the bottom of the slot 67, as shown in Fig. 2, with the numeral "1", meaning "first speed."

To move into the next or second speed from first or slow speed, the lever 54 is moved back from the bottom of the slot 67 to the cross slot 68, thus moving the rod 49 back to its neutral position, as shown in Fig. 8, and bringing the keys 23 back to the position shown in Fig. 6 with their lugs beneath the collar 33 between the gear wheels 12 and 13 and disconnecting the former from the shaft 4. As the inclined faces 36 of the keys 23 contact with said collar 33, the keys are rocked into unlocked position and move beneath the collar. The block 51 on the rod 49 is now directly opposite the block on the rod 48 and the lever 54 is moved laterally into the cross slot 68, thus being again in neutral. The lever 54 is then moved out of the cross slot 68 into the slot 66, and the lower end of said lever connected with the rod 48. The lever is then moved forward into the upper end of the slot 66, the rod 48 being moved rearward and through its yoke 46, moving the keys 22 rearward from the position shown in Fig. 6 to a position with their lugs 35 beneath the gear wheel 11. In such position, the lugs 35 of said keys are rocked to lock the gear wheel 11 to the shaft 4 and power is transmitted thereto from the shaft 1 through gear wheels 16, 7, 8 and 11. For this speed the sector plate is marked at the upper end of the slot 66 with the numeral "2", meaning "second speed."

To move from second speed into high speed or direct drive, at which time the shafts 1 and 4 are directly connected together and rotate at the same rate of speed, the lever 54 is moved from the upper end of the slot 66 into the lower end thereof. By such movement the rod 48 is moved from its extreme position rearward to its extreme position forward, and the keys 22 are moved from a position with their lugs 35 from beneath the gear wheel 11 to a position beneath the end 25 of the shaft 1, as shown in Fig. 20. When the lugs of the keys 22 reach such position, they are rocked by the members 43 beyond the shaft 4 to engage the internal shoulders 37, with which the end portion 25 of said shaft 1 is provided. The shaft 1 is then connected directly with the shaft 4 and rotated at the same rate of speed. At such time the other parts are in their neutral positions, as shown in Fig. 6 and 20. For high speed, the sector plate is marked at the bottom of the slot 66 with the numeral "3", meaning "third speed." During such movement of the keys 22, their forward ends are projected beyond the end of the body of the shaft 4 and are pushed against a ring 69 moving therewith the short keys 17, which have their inner ends constantly in contact with said ring 69, as shown in Figs. 6 and 20. Said keys 17 are held against said ring by a spring 70 in the shaft 1 and bearing against a plunger 71 slidably moved in said shaft and bearing against a cross bar 72. The latter extends across the shaft through an elongated slot 73 therein. Each key 17 is provided on opposite sides of its lug 19 with an inclined surface 74, 75. When the keys 17 are moved forward by the keys 22, the former are rocked to release the gear wheel 16 by the surfaces 74 co-acting with and moving under the ring 29, as shown in Fig. 18. The keys 17 are held in such position as long as the control lever 54 is in third or high speed, and, as the gear wheel 16 is disconnected from the shaft 1, no power is transmitted through said gear wheel 16 to the other gear wheels of the device, thus producing a silent transmission as the gear wheels do not revolve and therefore do not hum. By the use of the ring 69 between the keys 17 and 22, the former are moved simultaneously by the keys 22, no matter at what points the keys 22 engage said ring, as the latter avoids alining the keys for one set to move the other. Of the two keys 17, their lugs 19 are oppositely arranged so that, while both keys engage the gear wheel 16, one is the driving key and the other takes the back lash of the gear, the same arrangement being had with the keys 22, 23.

To move from third speed or direct drive back to neutral, the lever 54 is moved from the bottom of the slot 66 up to the cross slot 68 and then laterally into the latter. This brings the rod 48 back to neutral and the lugs 35 of the keys 22 beneath the collar 33 between the shaft 1 and the gear wheel 11, as shown in Fig. 6. In withdrawing the keys 22, the spring 70 expands and through the cross bar 72 forces the short keys 17 toward the keys 22, or, in other words, the keys 17 follow the ones 22. During such movement, the surfaces 75 of the keys 17 move under the part 27 of the shaft 1, causing the keys 17 to be rocked in locking position to engage the gear wheel 16 and connect the same to said shaft 1.

To move into reverse from neutral, the lever 54 is moved laterally from the cross slot 68 into the slot 67. This connects the rod 49 with said lever. The latter is then moved to the upper end of the slot 67, thereby moving the rod 49 rearward and through its yoke 45 carrying the keys 23 to position with their lugs 35 beneath the gear wheel 13, the members 43 rocking the keys into locking position and connecting the gear wheel 13 to the shaft 4. Then power is transmitted from the shaft 1 to the shaft 4 through the gear wheels 16, 7, 9, 14 and 13, and the shaft 4 rotated at a slower speed and in the opposite direction. At such time the keys 22 are in neutral position, as shown in Fig. 6. For reverse, the sector plate is marked at the upper end of the slot 67 with the letter "R," meaning "reverse."

To select at will the various speeds and reverse without being required to pass the control lever through neutral between each change, the following operation takes place. With the parts in neutral, the lever 54 may be moved directly into any one of the three speeds, or reverse. The movement from neutral directly into first or slow speed has been heretofore described. To move from neutral directly into second speed, the lever 54 is first moved laterally from the cross slot 68 into the slot 66 and then into the upper end of said slot. This movement may be made quickly and easily, the keys 22 being moved to lock the gear wheel 11 to the shaft 4. From second speed the parts may be shifted directly into high speed or direct drive without being required to go back through the cross slot 68 in making the change, as all that is necessary to do is to move the lever 54 from the upper to the lower end of the slot 66, the latter being straight throughout its length, thus offering no hindrance to this movement. To move from third speed or direct drive into second speed, the lever 54 is moved back to the upper end of said slot. With the type of sector plate shown, it is necessary to go through neutral from either second or third speed into either first speed or reverse. To change from neutral to either reverse or first speed, the lever 54 is moved from the cross slot 68 into the slot 67 and then to either end of said slot, depending upon whether first speed or reverse is desired. But from reverse into first speed, or from first speed into reverse, the lever 54 is merely moved from one end of the slot 67 to the other in the required direction and without at any time going into the cross-slot 68.

As shown in Figs. 17 and 19, each key 17 is provided between its lug 19 and cam surface 75 with a surface 76 extending across the key at the base of its lug, and being complementary to the inner cylindrical surface 77 of the hollow portion of the shaft 1 beneath the bearing portion 27. Each keyway 18 opens into the hollow portion of the shaft 1 beneath the part 27, so that the inner ends of the keys 17 may project into such portion of the shaft 1 and engage the ring 69. When the keys 17 are in locking position, that is, connecting the gear wheel 16 with the shaft 1, said keys have been moved endwise rearward a distance sufficient to bring the surface 76 of each key beneath the portion 27 of said shaft 1, and as said surface is circular and fits against the inner surface 77 of said portion 27 on opposite sides of the axis of the key, the latter is held from rotation or being rocked in either direction, thus preventing the keys 17 from being accidentally moved or jarred out of their locking position. When the keys 17 are in unlocked position, their surfaces 76 are clear of the portion 27, as shown in Fig. 18, but the keys are held from rotation by their lugs 19 being beneath the collar 29, as shown.

The lugs 47, 47 on each key are spaced apart a sufficient distance to permit the keys to have a limited amount of endwise movement with respect to the yokes. By this means, the actual movement of the key into locking position is not under the control of the operator, for as soon as the lug of the key is rocked sufficiently to project beyond the shaft 4 and engage a gear wheel selected, the momentum of the latter will complete the rocking movement of the key and, if any further endwise movement of the key is required to bring it into fully locking position, such movement is permitted by the amount of play allowed between it and its yoke. Manifestly, the operator is not required first to move the keys into an accurate position before they will engage the gear wheels selected, as all the operator is required to do is to move the keys to about the position required and the locking of the keys will take effect automatically.

The use of keys and gear wheels constantly in mesh, as described, enables any one of the speeds provided to be selected at the will of the operator and without being required to go through the several speeds in succession or throwing out the clutch before moving into the speed desired. Nor is it necessary to throw out the clutch and then synchronize the gears before making a change of speed. The construction described permits an instant change to be made from one speed to another without releasing the clutch, even when ascending a grade, as the movement of the keys from one gear wheel to another is so rapid and the gear wheel selected so quickly locked to the shaft 4 that the power connection between the shafts 1 and 4 is released only momentarily as the keys pass beneath the collars 33, and has no effect on the driving connection of the parts. By the key method, the transmission mechanism may be thrown into reverse while the car is standing still and the engine rotating, and then by throwing in the clutch the vehicle will be run backward. While the car is traveling rearward, the clutch may be thrown out to release the engine, and the control lever 54 thrown into first or slow speed without interfering with the rearward movement of the car under its momentum. While the car is running backward under its momentum, the steering wheels may be set for a forward direction and when the clutch is thrown in the car will run forward at first or slow speed without being required to again manipulate the lever 54. Moreover, a change of speed may be readily, easily and quickly made without releasing the clutch when running into and out of a soft or sandy stretch in a roadway, thus permitting the car to pick up speed or lower the speed the instant the occasions demands. By employing a multiple set of shift keys, with the keys of one set longer than the keys of another set, the several sets of keys may be divided between the plurality of speed gears and thus reduce the complete endwise throw of the keys to the minimum, and furthermore use a standard H-shaped sector plate with a key type of transmission. Furthermore, the endwise throw or movement of each set of keys is substantially the same, thus reducing the overall length of the device to the minimum and producing a compact structure, as the ends of the keys at the yokes need not extend beyond the speed gears, much over the distance that the keys are moved in changing speeds. In other words, none of the keys need be moved to a position extending rearward of the speed gears a distance equal to the length of the portion of the shaft 4 covered by said gears.

As shown in Figs. 1 and 6, the lever 54 extends downward through the bell housing 78 of the casing 2 and forward of the gear wheels, thus permitting the lever to be extended upward through the floor of the car at the steering post and be out of the way of the driver's feet. Moreover, said lever 54 in extending upward alongside of the steering post 62 and having its upper end terminating below the steering wheel, the lever is accessible directly below the steering wheel and thus does not require the driver to lean over from his seat and away from the steering wheel to grasp and move the same. Thus the driver while changing from one speed to another by the use of my device is not required to move into a strained or cramped position, or into a position away from the wheel, but may remain in the natural position of steering the car and keep his attention directed to that end, even while changing speed. Moreover, by reducing the endwise throw of the shift keys, the movement of the upper end of the control lever 54 is likewise reduced in changing speeds, and thus may be located alongside of the steering post, as no movement of the lever is far enough on either side of the steering post to interfere with the driver sitting close to the same.

Instead of using spring-pressed members 43 for the keys 22, 23, I may employ the form of mechanism shown in Fig. 22 to perform the same function. As illustrated, I have shown the shaft 4 provided with keys 22, 23, slidably and rockably mounted as before. The keys 22, 23 have lugs 47 for the yokes 45, 46 as before. Encircling the shaft 4 are three collars 79, 80, 81, held against movement endwise of said shaft. The collar 79 is forward of the yoke 46, the collar 80 between the yokes, and the collar 81 rearward of the yoke 45. Each key 22, 23 is provided on opposite ends of its lugs 47 with inclined faces or surfaces 82, 83, so that when the key is moved endwise beneath one collar the cam face adjacent that collar will coact therewith and rock the key into locking position, and when moved endwise in the opposite direction will cause its other surface to co-act with the other collar to rock the key into unlocked position. For example, the inclined surface 82 of each key 22 co-acts with the collar 79, and the surface 83 of the same key co-acts with the collar 80. The surface 82 of each key co-acts with the collar 80 and the other surface 83 with the collar 81.

By making the gears 7, 8 and 9 in a cluster, I am able to reduce the overall dimensions between the bearings and thus permit an increased toothed bearing and make a stronger set of gear wheels for a predetermined space.

In Fig. 23 I have shown a control or shift lever 84 extending upward from the casing 2 of the transmission mechanism and having its upper end bent outward and extending through a guide slit 85 in the instrument or dash board 86 of the car. Said slot is H-shaped as shown and similar to the one shown in Fig. 2, and is marked to indicate the various speeds and reverse to guide the driver in shifting from one speed into another. The instrument board is generally provided with an electric light 87 to illuminate the various instruments on the board when driving at night, and by having the control lever extend through the instrument board the guide slot is also illuminated, which facilitates the movement of the lever from one speed to another when driving at night, as the driver can always see in which direction to move the lever. It is due to the reduction of endwise throw of the shift keys that the movement of the upper end of the lever is reduced to the minimum and thus makes it possible to extend the lever through the instrument board 86 as shown.

While I have shown and described herein in detail a variable speed transmission mechanism embodying the features of my invention, it is to be, of course, understood that the various details of construction and arrangement of parts shown may be variously changed and modified without departing from the spirit and scope of my invention.

I claim as my invention:

1. A variable speed transmission mechanism having in combination, a driving shaft, a gear on and connected with said shaft, a driven shaft having grooves extending lengthwise thereof, speed gears loose on said driven shaft, a lay shaft, gears on said lay shaft and constantly in mesh with the gears on the driving and driven shafts, respectively, keys rockably mounted in said grooves and arranged so that there is a separate key for each of certain of said speed gears for locking the same to said driven shaft, and means, including a shift lever, for rocking the keys independently of each other into and out of locking engagement with their respective speed gears.

2. A variable speed transmission mechanism having in combination, a driving shaft, a gear on and connected with said shaft, a driven shaft having grooves extending lengthwise thereof, speed gears loose on said driven shaft, a lay shaft, gears on said lay shaft and constantly in mesh with the gears on the driving and driven shafts, respectively, keys slidably and rockably mounted in said grooves and arranged so that there is a separate key for each of certain of said speed gears for locking the same to said driven shaft, means for effecting the rocking of said keys into and out of locking engagement with their respective speed gears upon sliding the keys to and from the same, a shift lever, and means enabling the shift lever to slide said keys independently of each other.

3. A variable speed transmission mechanism having in combination, a driving shaft, a gear on and connected with said shaft, a driven shaft having grooves extending lengthwise thereof, speed gears loose on said driven shaft and arranged closely adjacent each other, a lay shaft, gears on said lay shaft and constantly in mesh with the gears on the driving and driven shafts, respectively, keys slidably and rockably mounted in said grooves and having their outer ends beyond said speed gears, one key being longer than another and arranged with the longer key for locking to the driven shaft a speed gear farthest from the outer ends of the keys and with the shorter key for locking to said driven shaft each of several of the remaining speed gears, means for effecting the rocking of said keys into and out of locking engagement with their respective speed gears upon sliding said keys to and from the same, a shift lever, and means enabling the shift lever to slide said keys independently of each other.

4. A variable speed transmission mechanism having in combination, a driving shaft, a gear on and connected with said shaft, a driven shaft having grooves extending lengthwise thereof, speed gears loose on said driven shaft and arranged closely adjacent each other, a lay shaft, gears on said lay shaft and constantly in mesh with the gears on the driving and driven shafts, respectively, two sets of keys slidably and rockably mounted in said grooves and having their outer ends beyond said speed gears, the keys of one set being longer than the keys of the other set and arranged with the longer set for locking to the driven shaft the speed gear farthest from the outer ends of the keys and with the shorter set for locking to the driven shaft any of the remaining speed gears, means for effecting the rocking of the keys of each set simultaneously into and out of locking engagement with their respective speed gears upon sliding the keys to and from the same, a shift lever, and means enabling the shift lever to engage the outer ends of the keys of either set, for sliding the same independently of each other.

5. A variable speed transmission mechanism having in combination, a driving shaft provided with locking shoulders, a gear loose on said shaft, means for releasably locking said gear to said shaft, a driven shaft having grooves extending lengthwise thereof, speed gears loose on said driven shaft and arranged closely adjacent each other, a lay shaft, gears on said lay shaft and constantly in mesh with the gears on the driving and driven shafts, respectively, two sets of keys slidably and rockably mounted in said grooves, the keys of one set being longer than the keys of the other set and arranged with the longer set when in one position to engage said shoulders for locking the driving and driven shafts directly together, and when in another position for locking to said driven shaft the speed gear adjacent said driving shaft, the shorter set of keys being arranged for locking to the driven shaft any of the remaining speed gears, means for effecting the rocking of the keys of each set simultaneously into and out of locking engagement with their respective speed gears and shoulders, a shift lever, and means enabling the shift lever to be connected with either set of keys for sliding the same independently of each other, the means releasably locking the gear to the driving shaft being actuated to unlock said gear from said shaft upon moving the longer set of keys into position locking the driving and driven shafts directly together.

6. In a variable speed transmission mechanism, the combination with a driving shaft, of a driven shaft, gear wheels loosely mounted on said shafts for transmitting power from one to the other, a key rockably mounted on the driving shaft for releasably locking thereto the gear wheel loosely mounted thereon, and means, including a manually operable member, for selectively locking to the driven shaft any one of the gear wheels loosely mounted thereon and for directly connecting the driving and driven shafts together, said means acting when actuated to provide a direct connection between said shafts to cause the rocking of said key to disconnect from said driving shaft the gear wheel thereon.

7. A variable speed transmission mechanism having in combination, a driving shaft having a hollow end portion provided with locking shoulders, said shaft having grooves in advance of said shoulders and extending lengthwise thereof, a gear loose on the grooved portion of said shaft, keys slidably and rockably mounted in said grooves and provided with lugs to engage said gear and lock the same to said shaft, means for effecting the rocking of said keys into and out of locking engagement with said gear upon sliding said keys, a driven shaft alined with said driving shaft and extending into the hollow end thereof, said driven shaft having grooves extending lengthwise thereof, speed gears loose on said driven shaft, a lay shaft, gears on said lay shaft and constantly in mesh with the gears on the driving and driven shafts, respectively, keys slidably and rockably mounted in the grooves in said driven shaft and arranged so that there is one set of keys for locking each of certain of the speed gears to said driven shaft, and another set when in one position lock the remaining speed gear to said driven shaft and when in another position engage said shoulders for locking the driving and driven shafts directly together, means for effecting the rocking of the driven shaft keys into and out of locking engagement with their respective speed gears and shoulders upon sliding said keys on said driven shaft, and means, including a shift lever, for sliding each set of driven shaft keys independently of each other, the keys on the driving shaft being moved by the keys on the driven shaft out of locking engagement with the gear on the driving shaft upon the locking of said two shafts directly together.

8. A variable speed transmission mechanism having in combination, a driving shaft having a hollow end portion provided with locking shoulders, said shaft having grooves in advance of said shoulders and extending lengthwise thereof, a gear loose on the grooved portion of said shaft, keys slidably and rockably mounted in said grooves and provided with lugs to engage said gear and lock the same to said shaft, means for effecting the rocking of said keys into and out of locking engagement with said gear upon sliding said keys, a driven shaft extending into the hollow end of said driving shaft, speed gears loose on said driven shaft, a lay shaft, gears on said lay shaft and constantly in mesh with the gears on said driving and driven shafts, respectively, and means on the driven shaft for selectively locking the speed gears thereto and the driving and driven shafts directly together, said means acting when moved to lock the driving and driven shafts together to move said keys endwise and effect the rocking thereof out of locking engagement with the gear on said driving shaft.

9. In a variable speed transmission mechanism, driving and driven shafts in axial alinement, gear wheels loosely mounted on said driving and driven shafts for transmitting power from one shaft to the other, a plurality of keys slidably and rockably mounted on said driving and driven shafts for releasably locking thereto the gear wheels loosely mounted thereon and for directly connecting the driving and driven shafts together, a ring interposed between the keys on the driving and driven shafts to permit the keys on the driven shaft to move the keys on the driving shaft out of locking engagement with the gear wheel loosely mounted thereon, and means for moving the keys on the driven shaft.

10. In a transmission mechanism, a shaft, a gear wheel loosely mounted thereon, a key slidably and rockably mounted on said shaft, said key having a lug adapted to project beyond the shaft to engage said gear wheel for locking the same to said shaft, said key having one end extending beneath a portion of said shaft and provided with a surface complementary to the inner circular surface of the portion of the shaft beneath which the key extends, for holding the key against rocking movement in either direction when its lug projects beyond the shaft for locking the gear wheel thereto.

11. In a transmission mechanism, a shaft, a gear wheel loosely mounted thereon, a key slidably and rockably mounted on said shaft, a ring surrounding said shaft at said gear wheel, said key having a lug adapted to project beyond the shaft for engaging said gear wheel and locking the same to the shaft, said key having inclined surfaces on the opposite sides of said lug for coacting with a portion of the shaft and said ring for rocking the key into and out of locking position in the endwise movement of said key, and means for moving said key endwise.

12. In a transmission mechanism, a shaft, a gear wheel loosely mounted thereon, a key slidably and rockably mounted on said shaft, a ring on said shaft at said gear wheel, said key having a lug adapted to project beyond the shaft for connecting the gear wheel thereto, and provided on opposite sides of said lug with inclined surfaces to coact with the part of said shaft and said ring for rocking the key into and out of locking engagement with said gear wheel in the endwise movement of the key, said key having a surface at the base of said lug for engaging the inner face of the portion of the shaft beneath which one end of the key extends, for holding the key against rocking movement in either direction when the key is in locking position with its lug engaging said gear wheel, and means for moving said key endwise.

13. In a transmission mechanism, a shaft, a plurality of gear wheels loosely mounted on said shaft, a plurality of keys slidably and rockably mounted on said shaft for selectively locking the gear wheels thereto, means adapted in the endwise movement of said keys to rock the same out of locking engagement with said gear wheels, a collar secured to said shaft and having the keys extend beneath the same, a plurality of spring actuated members pivotally mounted on said collar, one for each key, and bearing constantly against one side of the key in a direction to rock the same into locking position.

14. A variable speed transmission mechanism having in combination, a driving shaft, a gear on and connected with said shaft, a driven shaft alined with said driving shaft and having grooves extending lengthwise thereof, speed gears loose on said driven shaft, a lay shaft, gears on said lay shaft and constantly in mesh with the gears on the driving and driven shafts, respectively, keys slidably and rockably mounted in said grooves and arranged in sets, the keys of one set being longer than those of another set and adapted to selectively lock to the driven shaft each of certain of said speed gears, means for effecting the rocking of said keys upon sliding the same, shift rods, one for each set of keys, a yoke connecting each shift rod with its respective set of keys, and a shift lever adapted to be engaged with any of the rods for sliding one set of keys independently of the other set.

15. In a variable speed transmission mechanism, the combination with a driving shaft, of a driven shaft, a plurality of gear wheels loosely mounted on one of said shafts for transmitting power from one shaft to the other, a plurality of keys slidably and rockably mounted on the shaft on which said gear wheels are loosely mounted, and arranged in sets, with one set locking to said shaft a gear wheel not engaged by the keys of the other set, shift rods one for each set of keys, a yoke connecting each rod with its set of keys, and a manually operable shift lever movable into engagement with either of said rods for moving the same and said keys.

16. A variable speed transmission mechanism having in combination, a driving shaft, a gear on and connected with said shaft, a driven shaft having concave grooves extending lengthwise thereof, speed gears loose on said driven shaft and arranged closely adjacent each other, a lay shaft, gears on said lay shaft and constantly in mesh with the gears on the driving and driven shafts, respectively, keys slidably and rockably mounted in said grooves for selectively locking the speed gears to said driven shaft, said keys having lugs adapted to be projected beyond said driven shaft to engage their respective speed gears and lock the same to said driven shaft, means for effecting the rocking of said keys out of locking engagement with their respective speed gears upon sliding the keys from said gears, a ring surrounding and secured to said driven shaft, spring pressed members pivoted on said ring, one for each of said keys and bearing against the same in a manner to rock the key into locking engagement with its associated speed gear upon sliding the key thereto, and a shift lever for sliding said keys.

In testimony that I claim the foregoing as my invention, I affix my signature this 5th day of September, A. D. 1919.

LEON J. CAMPBELL.